United States Patent
Holley et al.

(10) Patent No.: US 9,104,575 B2
(45) Date of Patent: Aug. 11, 2015

(54) REDUCED-IMPACT ERROR RECOVERY IN MULTI-CORE STORAGE-SYSTEM COMPONENTS

(75) Inventors: Bret Wayne Holley, Tucson, AZ (US); Ashwani Kumar, Tucson, AZ (US); Tiep Quoc Pham, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/589,128

(22) Filed: Aug. 18, 2012

(65) Prior Publication Data

US 2014/0053019 A1   Feb. 20, 2014

(51) Int. Cl.
G06F 11/07   (2006.01)
G06F 11/20   (2006.01)

(52) U.S. Cl.
CPC .......... *G06F 11/0793* (2013.01); *G06F 11/076* (2013.01); *G06F 11/0724* (2013.01); *G06F 11/0766* (2013.01); *G06F 11/2092* (2013.01); *G06F 11/2005* (2013.01); *G06F 11/2007* (2013.01)

(58) Field of Classification Search
CPC ............ G06F 11/0724; G06F 11/0757; G06F 11/2025; G06F 11/2028
USPC .......................................................... 714/11
See application file for complete search history.

(56) References Cited

U.S. PATENT DOCUMENTS

| | | | |
|---|---|---|---|
| 7,716,520 B2 | 5/2010 | Tabei et al. | |
| 8,078,907 B2 | 12/2011 | Donlin et al. | |
| 2002/0188711 A1 | 12/2002 | Meyer et al. | |
| 2006/0230306 A1* | 10/2006 | Richards et al. | 714/7 |
| 2007/0168760 A1 | 7/2007 | Ko et al. | |
| 2007/0220369 A1* | 9/2007 | Fayad et al. | 714/48 |
| 2007/0240018 A1 | 10/2007 | Nalawadi et al. | |
| 2009/0172369 A1* | 7/2009 | Stillwell et al. | 712/228 |
| 2009/0316798 A1* | 12/2009 | Mimar | 375/240.26 |
| 2013/0151894 A1* | 6/2013 | Honda et al. | 714/17 |

* cited by examiner

*Primary Examiner* — Jigar Patel
(74) *Attorney, Agent, or Firm* — Nelson and Nelson; Daniel P. Nelson; Alexis V. Nelson

(57) ABSTRACT

A method for recovering from an error in a multi-core storage-system component is disclosed. In one embodiment, such a method includes detecting an error in a first core of a multi-core component. The method determines whether the error was one of (1) detected by the first core; and (2) detected by a core other than the first core. In the event the error was detected by the first core and the error is recoverable, the first core recovers from the error without substantially impacting operation of other cores in the multi-core component. In the event the error was detected by a core other than the first core and the error is recoverable, a core other than the first core recovers from the error without substantially impacting operation of other cores in the multi-core component. A corresponding apparatus and computer program product are also disclosed.

18 Claims, 5 Drawing Sheets

REDUCED-IMPACT ERROR RECOVERY IN MULTI-CORE STORAGE-SYSTEM COMPONENTS

BACKGROUND

1. Field of the Invention

This invention relates to apparatus and methods for recovering from errors in multi-core storage-system components.

2. Background of the Invention

In many storage systems, particularly storage system that are used for critical databases, file sharing on networks, business applications, or the like, ensuring high availability is critical. For this reason, redundancy is built into many storage systems to ensure that if one or more hardware components fail, other hardware components are available to pick up the workload of the failed components and provide continuous availability. For example, the IBM DS8000® enterprise storage system includes multiple servers to ensure that if one server fails, the other server remains functional to enable I/O to continue between hosts and storage devices. This built-in redundancy helps to reduce the impact that component failures have on organizational operations.

In such storage systems, performance is also critical due to the high workloads. In order to increase performance, multiple cores may be built into various components of the storage systems. For example, the IBM DS8000® enterprise storage system may utilize host adapters and device adapters to communicate with host devices (e.g., open system and/or mainframe servers) and storage devices (e.g., disk drives and solid state drives) respectively. The processors of these host adapters and device adapters may include multiple cores to improve performance (e.g., increase throughput).

Unfortunately, such multi-core storage-system components may experience errors from time to time. Such errors may be manifest as either hardware or software errors. When such errors occur, the solution is typically to reset or restart the entire multi-core component, such as by performing a warmstart. Such a reset or restart temporarily removes the entire multi-core component (e.g., adapter) from service, thereby undesirably interrupting operations. If such errors persist, the interruptions to operations may become more frequent and severe.

In view of the foregoing, what are needed are apparatus and methods to more efficiently recover from errors in multi-core storage-system components. Ideally, such apparatus and methods will minimize the availability and performance impacts on the multi-core components.

SUMMARY

The invention has been developed in response to the present state of the art and, in particular, in response to the problems and needs in the art that have not yet been fully solved by currently available systems and methods. Accordingly, the invention has been developed to provide systems and methods to improve the efficiency of tiered storage architectures. The features and advantages of the invention will become more fully apparent from the following description and appended claims, or may be learned by practice of the invention as set forth hereinafter.

Consistent with the foregoing, a method for recovering from an error in a multi-core storage-system component (hereinafter "multi-core component") is disclosed. In one embodiment, such a method includes detecting an error in a first core of a multi-core component. The method determines whether the error was one of (1) detected by the first core; and (2) detected by a core other than the first core. In the event the error was detected by the first core and the error is recoverable, the first core recovers from the error without substantially impacting operation of other cores in the multi-core component. In the event the error was detected by a core other than the first core and the error is recoverable, a core other than the first core recovers from the error without substantially impacting operation of other cores in the multi-core component.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
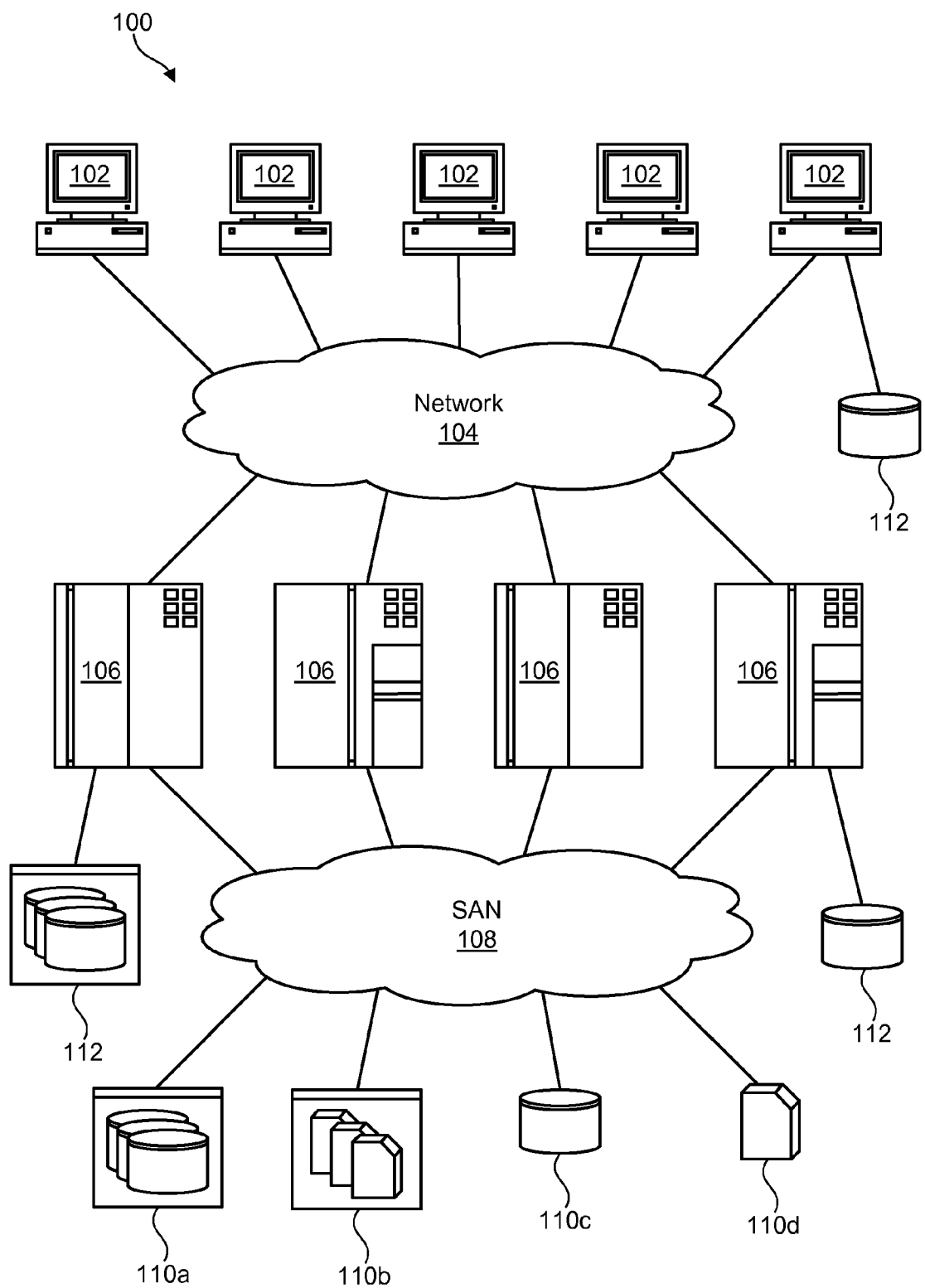
FIG. 1 is a high-level block diagram showing one example of a network environment where an apparatus and method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer-readable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain or store the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a network architecture 100 is illustrated. The network architecture 100 is presented to show one example of an environment where various embodiments of the invention might operate. The network architecture 100 is presented only by way of example and not limitation. Indeed, the systems and methods disclosed herein may be applicable to a wide variety of different network architectures in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
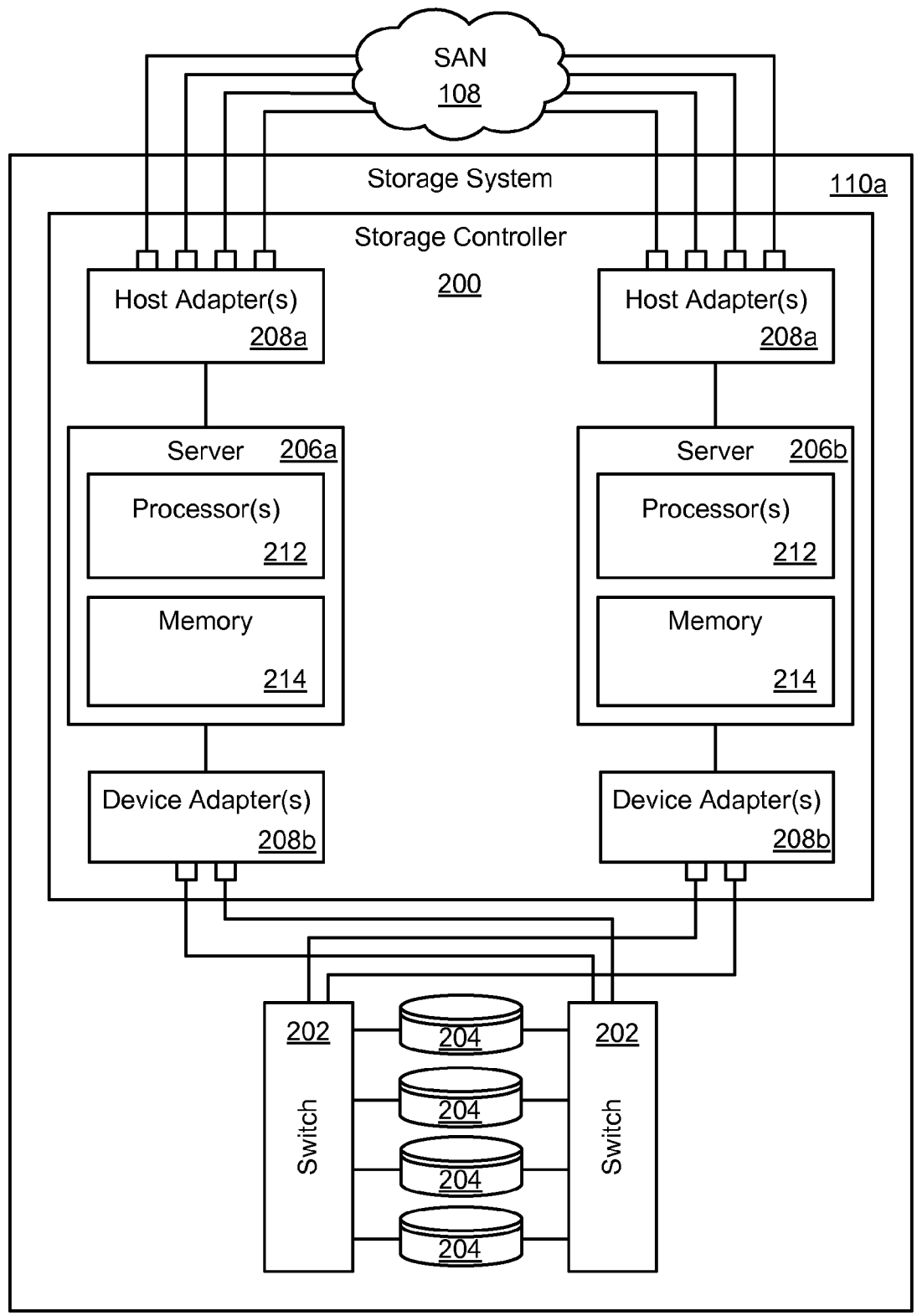
FIG. 2 is a high-level block diagram showing one example of a storage system where an apparatus and method in accordance with the invention may be implemented.

Referring to FIG. 2, one embodiment of a storage system 110a containing an array of storage drives 204 (e.g., hard-disk drives and/or solid-state drives) is illustrated. The internal components of the storage system 110a are shown since the systems and methods disclosed herein may, in certain embodiments, be implemented within various components of such a storage system 110a, although the systems and methods may also be applicable to components in other storage systems. As shown, the storage system 110a includes a storage controller 200, one or more switches 202, and one or more storage drives 204 such as hard disk drives and/or solid-state drives (such as flash-memory-based drives). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208a and device adapters 208b to connect the storage controller 200 to host devices 106 and storage drives 204, respectively. Multiple servers 206a, 206b provide redundancy to ensure that data is always available to connected hosts 106. Thus, when one server 206a fails, the other server 206b may pick up the I/O load of the failed server 206a to ensure that I/O is able to continue between the hosts 106 and the storage drives 203, 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the apparatus and methods disclosed herein are not limited to the IBM DS8000™ enterprise storage system 110a, but may be implemented in any comparable or analogous storage system, regardless of the manufacturer, product name, or components or component names associated with the system. Any storage system that could benefit from one or more embodiments of the invention is deemed to fall within the scope of the invention. Thus, the IBM DS8000™ is presented only by way of example and is not intended to be limiting.

Figure 3:
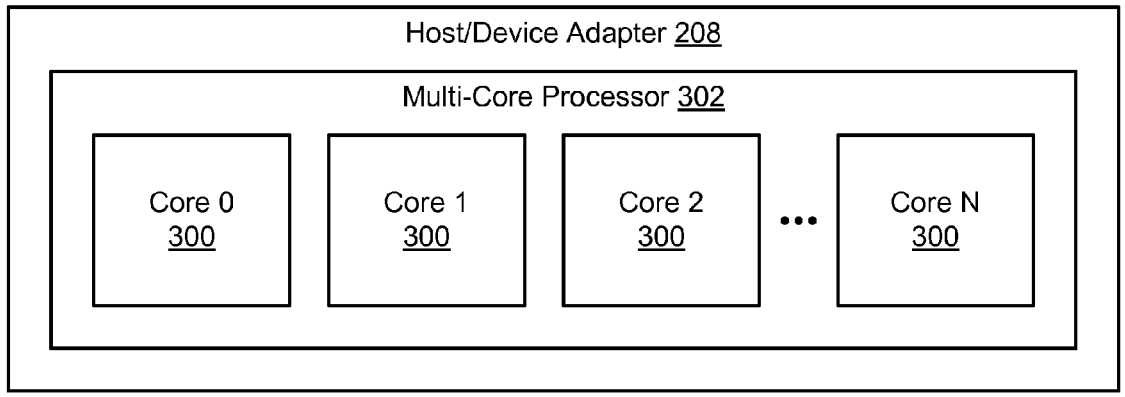
FIG. 3 is a high-level block diagram showing one example of a multi-core storage-system component, in this example a multi-core host/device adapter for use in a storage system.

Referring to FIG. 3, as previously mentioned, in order to increase performance, multiple cores 300 may be built into various components of a storage system 110. For example, as discussed above, a storage system 110 may utilize host adapters 208a and device adapters 208b to communicate with host systems 106 (e.g., open system and/or mainframe servers) and storage devices 204 (e.g., disk drives and/or solid state drives) respectively. The processors 302 of these host adapters 208a and device adapters 210a may include multiple cores 300 to improve performance (e.g., increase throughput) by performing multiple tasks simultaneously. Each of these cores 300 is generally on a single chip or integrated circuit die, with internal circuitry connecting the cores 300 together. For the purposes of this disclose, the phrase "multi-core storage-system component," or simply "multi-core component," will refer to a storage-system component that has multiple cores 300 present on the same chip or integrated circuit die.

Figure 4:
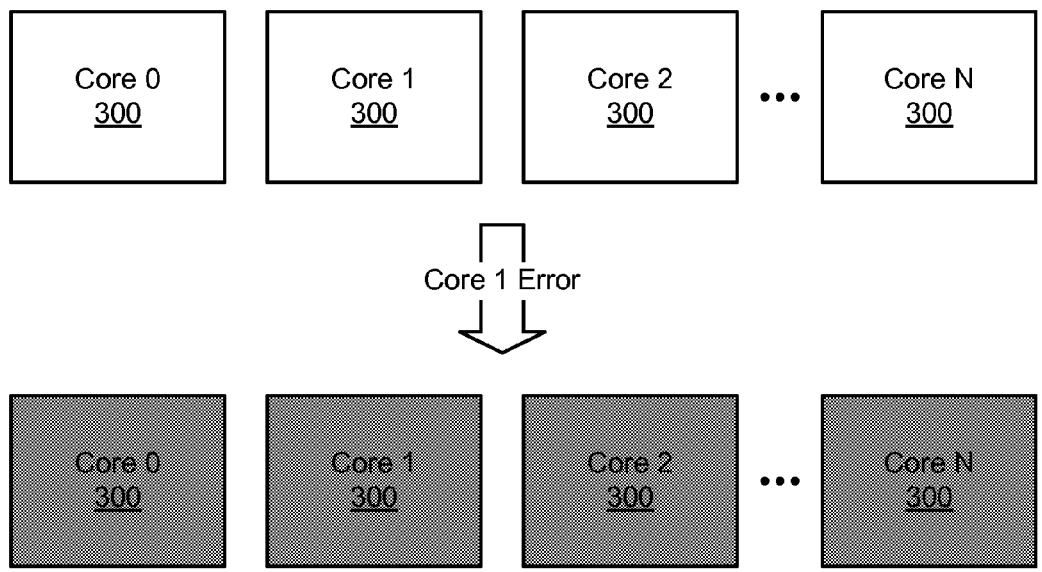
FIG. 4 is a high-level block diagram showing a prior art example where all cores of a multi-core component participate in error recovery.

Unfortunately, such multi-core storage-system components (e.g., host/device adapters 208a, 208b) may experience errors from time to time. Such errors may be manifest as either hardware or software (e.g., microcode) errors. When such errors occur, the solution is typically to perform a system-wide error recovery, such as a warmstart, coldstart, or reboot of the entire multi-core component. For example, FIG. 4 shows a prior art process where an error in one core (i.e., Core 1) causes all the cores (Cores 1-N) to participate in a system-wide error recovery process. Such a system-wide error recovery process interrupts operation of all cores 300 of the multi-core component regardless of whether all cores 300 caused or were associated with the error. This can have a significant impact on the performance and availability of the multi-core component as well as the overall storage system 110. In some cases, the system-wide error recovery of the multi-core component may lead to data loss or a system outage.

To mitigate the problems discussed above, more intelligent error recovery is needed to maintain system availability, performance, and data integrity. An apparatus and method to provide more intelligent error recovery is disclosed herein. Instead of performing a system-wide error recovery, the disclosed apparatus and methods more closely tailor error recovery procedures to the core or cores that are associated with an error condition. In certain cases, a core that experiences an error may detect the error and recover from the error on its own without significantly impacting operation of other cores 300 in a multi-core component. In other cases, a core other than a core experiencing an error may detect the error and help the core recover from the error without significantly impacting operation of other cores 300 in a multi-core component. The cores 300 that remain operational during the error recovery process may help to maintain system availability, performance, and data integrity.

Figure 5:
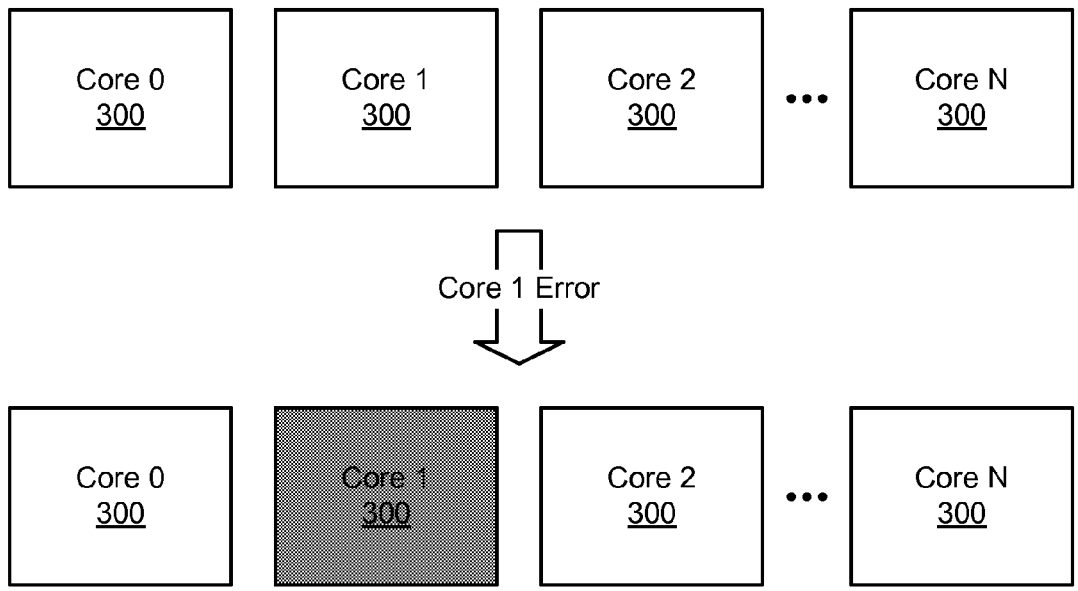
FIG. 5 is a high-level block diagram showing an example of a single core of a multi-core component self-recovering from an internal error without significantly impacting operation of other cores in the multi-core component.

For example, referring to FIG. 5, assume that an error has occurred in "Core 1" of a multi-core component comprising Cores 1-N. In certain embodiments in accordance with the invention, Core 1 will be able to detect the error and recover from the error without involving other cores 300 of the multi-core component. The other cores 300 may continue operating normally to maintain system performance and availability.

Figure 6:
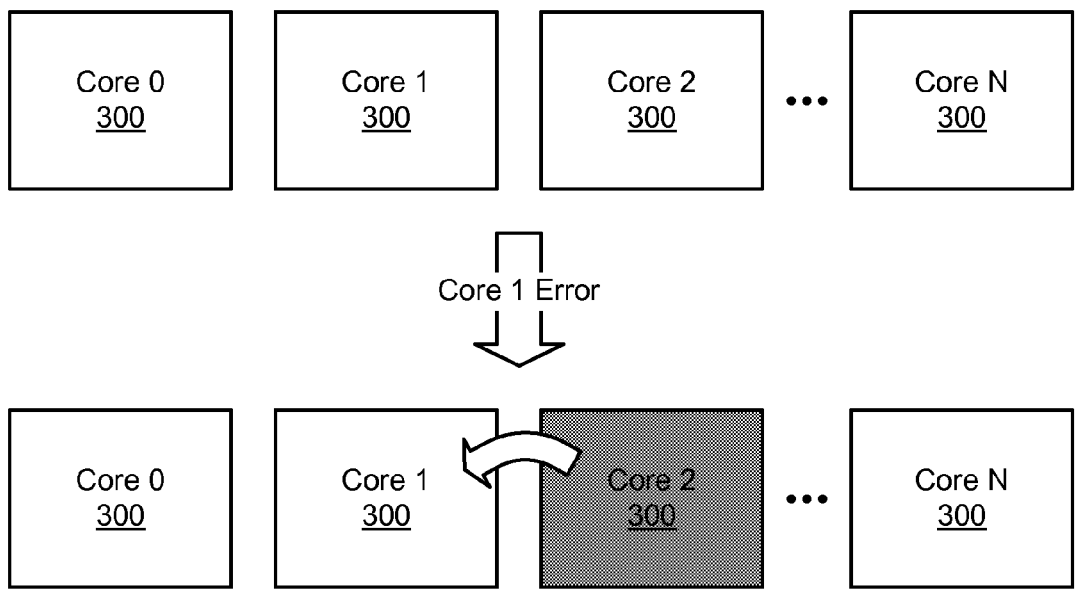
FIG. 6 is a high-level block diagram showing an example of a single core helping another core to recover from an error without significantly impacting operation of other cores in the multi-core component.

Referring to FIG. 6, in another embodiment, assume that an error has occurred in Core 1 that is not detected by Core 1, but rather by another core (e.g., Core 2) in the multi-core component. In certain embodiments, this other core may help Core 1 to recover without significantly impacting the operation of other cores 300 in the multi-core component. In certain embodiments, the core that helps Core 1 to recover may be the same core that detected the error. In other embodiments, the core that helps Core 1 to recover may be a core 300 other than the core 300 that detected the error. In certain embodiments, a circular queue algorithm may be used to determine which core 300 helps another core 300 to recover, thereby substantially evenly spreading the error-recovery workload across all cores 300 in the multi-core component. In other embodiments, each core 300 may help the same core 300 to recover from errors. For example, Core 1 may help Core 0 to recover, Core 2 may help Core 1 to recover, Core 3 may help Core 2 to recover, and so forth. Other algorithms or protocols are possible and within the scope of the invention.

Figure 7:
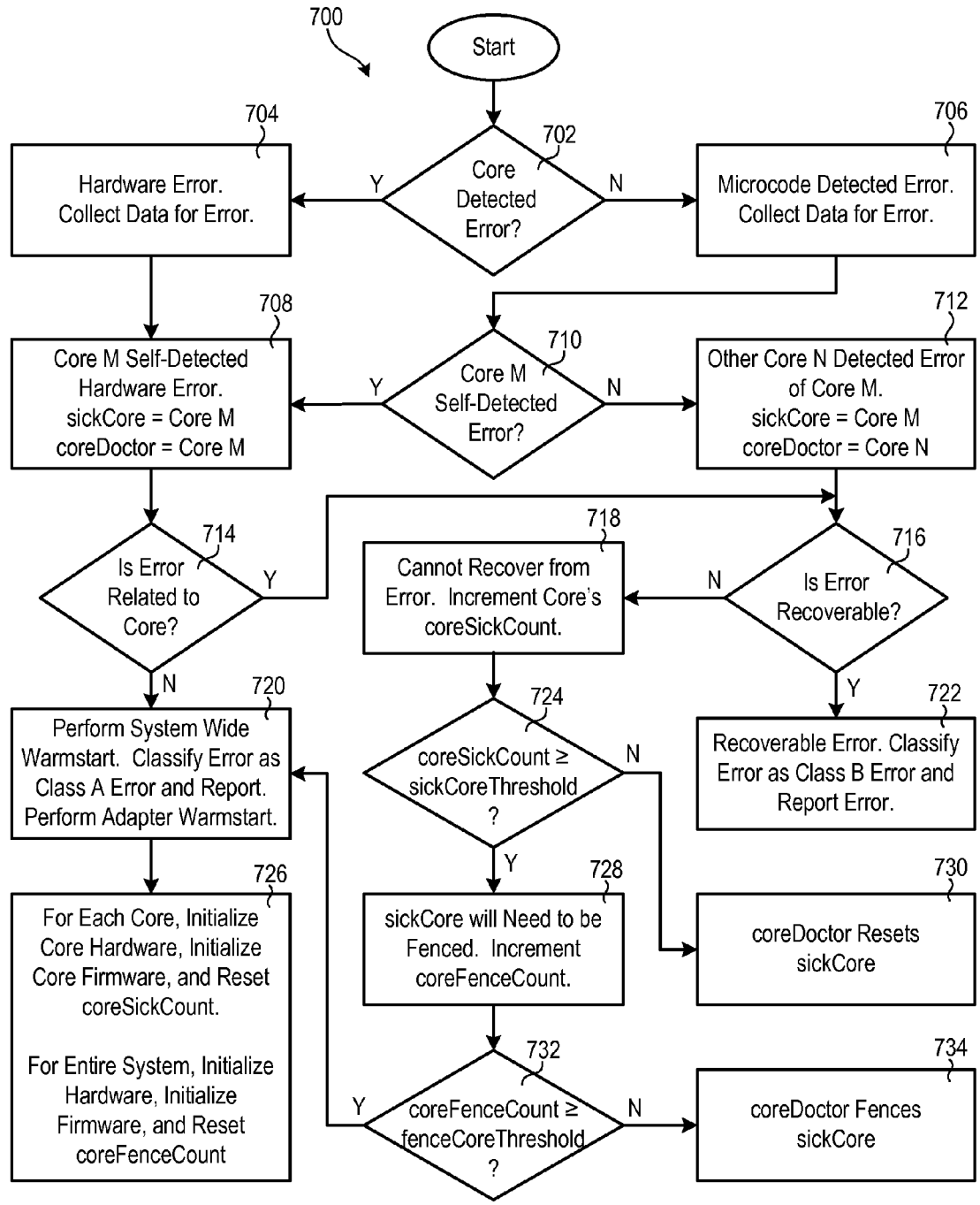
FIG. 7 is a process flow diagram showing one embodiment of a method for recovering from errors in a multi-core storage-system component.

Referring to FIG. 7, one embodiment of an improved method 700 for recovering from errors in a multi-core component is illustrated. In general, the illustrated method 700 uses a tiered approach to error recovery, with more benign measures being taken first, followed by more drastic measures if the more benign measures are not successful. If possible, a core 300 will self heal, meaning that it will detect and recover from an error on its own without requiring attention from other cores 300 or impacting the operation of other cores 300.

In the event a core cannot detect and/or recover from an error on its own, or an error of one core 300 is detected by another core 300, a core 300 other than the core 300 that experienced the error may try to help the core 300 that experienced the error to recover from the error without significantly impacting the operation of other cores 300 in the multi-core component. If error recovery procedures for a particular core 300 are not successful or a particular error has occurred multiple times, the core 300 may be fenced (i.e. removed from service). If tailored error recovery is not successful or a threshold number of cores 300 are fenced, more drastic measures, such as system-wide error recovery procedures, may be invoked. In this way, the disclosed method 700 gradually escalates error recovery procedures to maintain system availability, performance, and data integrity as much as possible.

As shown in FIG. 7, when an error occurs, the method 700 initially determines 702 whether the error is a core-detected error (i.e., a hardware-based error detected by the core 300 where the error occurred). If the error is a core-detected error, the method 700 proceeds to block 704. If the error is not a core-detected error (i.e., a microcode-detected error), the method 700 proceeds to block 706. In either block 704, 706, the method 700 collects data associated with the error and transmits this data to a desired location for future debugging purposes. For example, if the error occurred in a host/device adapter 208 of a storage system 110a such as that illustrated in FIG. 2, data may be collected and sent to one or more of the servers 206a, 206b for future debugging purposes.

As shown in block 708, if the error is a hardware error, meaning that the error occurred in the hardware of Core M and was also detected by Core M, this indicates that the "sickCore" (i.e., the core that experienced the error) is Core M and the "coreDoctor" (i.e., the core that fixes or recovers from the error) is also Core M. The method 700 may then determine 714 if the error is related to Core M or related to a larger system-wide problem (i.e. core independent). If the error is part of a larger system-wide problem, the method 700 performs 720 a system-wide error recovery procedure, such as a warmstart of the entire multi-core component. When such a system-wide recovery procedure is performed, the method 700 may classify the error as a "Class A" error (i.e., a more serious error that requires system-wide recovery) and report the error for future debugging purposes, such as by reporting the error to one or more of the servers 206a, 206b.

If, at step 714, the error is determined to be related to Core M and not some larger system-wide problem, the method 700 determines 716 whether the error is recoverable (i.e., Core M is able to recover on its own without some larger system-wide error recovery procedure). If the error is recoverable, Core M recovers on its own. The method 700 may classify the error as a "Class B" error (i.e., a less serious error where a core can recover on its own) and report the error for future debugging purposes, such as by reporting the error to one or more of the servers 206a, 206b.

Returning again to block 706, if the error is a microcode-detected error, the method 700 determines 710 whether the microcode error occurred in Core M and was detected by Core M (i.e., Core M self-detected the error). If Core M did not detect the error, then another core (i.e., Core N) detected the error that occurred in Core M as indicated in block 712. In such a case, the "sickCore" (i.e., the core that experienced the error) is Core M and the "coreDoctor" (i.e., the core that fixes or recovers from the error) is Core N. In other words, Core N will help Core M recover from the error. The method 700 then determines 716 whether the error is recoverable (i.e., Core N is able to recover from the error without some larger system-wide error recovery procedure). If the error is recoverable, Core N recovers from the error. The error may be classified as a "Class B" error and reported for future debugging purposes.

If, at step 716, an error is determined to be unrecoverable, the method 700 increments 718 a "coreSickCount" of the core 300 that experienced the error. In certain embodiments, a "coreSickCount" may be maintained for each core 300 in the multi-core component. Each time a core 300 in the multi-core component experiences an unrecoverable error, the core's coreSickCount may be incremented. If the coreSickCount remains below a selected threshold value, a more benign error recovery action may be taken to recover from the error. If, on the other hand, the coreSickCount reaches the threshold value, a more drastic recovery action may be taken.

For example, as shown in FIG. 7, once the core's coreSickCount has been incremented at step 718, the method 700 compares 724 the core's coreSickCount to a threshold value, referred to herein as a "sickCoreThreshold." If the coreSickCount has not reached the sickCoreThreshold, the method 730 resets 730 the core 300 that experienced the error in an attempt to restore the core 300 to a good working state. The reset may be limited in that it may only be performed on the core 300 that experienced the error.

If, on the other hand, the coreSickCount has reached the sickCoreThreshold, the method 700 may determine 728 that the core 300 needs to be fenced (i.e., removed from service). At this point, the method 700 may increment 728 a "coreFenceCount," which may keep track of the number of cores 300 that have been fenced. If the number of cores 300 that have been fenced is below a threshold value (referred to herein as a "fenceCoreThreshold"), the core 300 that experienced the error may be fenced 734. If, on the other hand, the number of cores that have been fenced has reached the fenceCoreThreshold, the method 700 may perform a more drastic action, such as a system-wide error recovery process.

For example, the illustrated method 700 may perform 720 a system-wide warmstart in an attempt to return fenced cores to a working state. The system-wide error recovery may involve the multi-core component (e.g., adapter) and potentially other components communicating with the multi-core component. For example, where the multi-core component is an adapter 208, devices such as servers 206, host systems 106, and/or storage devices 204 may be restarted or reset along with the adapter 208 to bring the devices into a known good state.

Block 726 shows various steps that may be performed when performing a system-wide error recovery. For example, for each core 300 in the multi-core component, the method 700 may initialize the core hardware and firmware and reset the coreSickCount. For the entire system (e.g., system-on-a chip or other related hardware), the method 700 may initialize the hardware and firmware and reset the coreFenceCount. The steps listed in block 726 are simply examples of actions that may be taken in a system-wide error recovery and are not intended to be limiting. Other actions may be taken or omitted as needed.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for recovering from an error in a multi-core storage-system component (hereinafter "multi-core component"), the method comprising:
   detecting an error in a first core of a multi-core component;
   maintaining an error count for the first core, the error count keeping track of a number of errors experienced by the first core;
   in the event the error count has reached a threshold value, withdrawing the first core from service in the multi-core component;

maintaining a fence count indicating a number of cores of the multi-core component that have been withdrawn from service; and in the event the fence count has reached a threshold value, performing a system-wide error recovery process for all cores in the multi-core component.

2. The method of claim 1, wherein the error count keeps track of a number of non-recoverable errors experienced by the first core.

3. The method of claim 1, further comprising, in the event the first core has experienced an error and the error count has not reached a threshold value, resetting the first core.

4. The method of claim 1, further comprising resetting the error count after withdrawing the first core from service in the multi-core component.

5. The method of claim 1, further comprising recovering from the error by a second core of the multi-core component.

6. The method of claim 5, further comprising selecting the second core from the multi-core component using a circular queue algorithm that substantially evenly distributes an error recovery workload across cores of the multi-core component.

7. The method of claim 1, further comprising resetting the fence count after performing a system-wide reset of all cores in the multi-core component.

8. A computer program product for recovering from an error in a multi-core storage-system component (hereinafter "multi-core component"), the computer program product comprising a non-transitory computer-readable medium having computer-usable program code embodied therein, the computer-usable program code comprising:

computer-usable program code to detect an error in a first core of a multi-core component;

computer-usable program code to maintain an error count for the first core the error count keeping track of a number of errors experienced by the first core;

computer-usable program code to, in the event the error count has reached a threshold value, withdraw the first core from service in the multi-core component;

computer-usable program code to maintain a fence count indicating a number of cores of the multi-core component that have been withdrawn from service; and computer-usable program code to, in the event the fence count has reached a threshold value, perform a system-wide error recovery process for all cores in the multi-core component.

9. The computer program product of claim 8, wherein the error count keeps track of a number of non-recoverable errors experienced by the first core.

10. The computer program product of claim 8, further comprising computer-usable program code to, in the event the first core has experienced an error and the error count has not reached a threshold value, reset the first core.

11. The computer program product of claim 8, further comprising computer-usable program code to reset the error count after withdrawing the first core from service in the multi-core component.

12. The computer program product of claim 8, further comprising computer-usable program code to recover from the error by a second core of the multi-core component.

13. The computer program product of claim 12, further comprising computer-usable program code to select the second core from the multi-core component using a. circular queue algorithm that substantially evenly distributes an error recover workload across cores of the multi-core component.

14. The computer program product of claim 8, further comprising computer-usable program code to reset the fence count after performing a system-wide reset of all cores in the multi-core component.

15. An apparatus for recovering from an error in a multi-core storage-system component (hereinafter "multi-core component"), the apparatus comprising:

a multi-core component comprising a plurality of cores to process instructions, the multi-core component configured to:

detect an error in a first core of the multi-core component;

maintain an error count for the first core, the error count keeping track of a number of errors experienced by the first core;

in the event the error count has reached a threshold value, withdraw the first core from service in the multi-core component;

maintain a fence count indicating a number of cores of the multi-core component that have been withdrawn from service; and in the event the fence count has reached a threshold value, perform a system-wide error recovery process for all cores in the multi-core component.

16. The apparatus of claim 15, wherein the error count keeps track of a number of non-recoverable errors experienced by the first core.

17. The apparatus of claim 15, wherein the multi-core component is further configured to, in the event the first core has experienced an error and the error count has not reached a threshold value, reset the first core.

18. The apparatus of claim 15, further comprising recovering from the error by a second core of the multi-core component, wherein the second core is selected from the multi-core component using a circular queue algorithm that substantially evenly distributes an error recovery workload across cores of the multi-core component.

* * * * *